United States Patent
Kwak et al.

(10) Patent No.: US 7,848,288 B2
(45) Date of Patent: Dec. 7, 2010

(54) METHOD AND APPARATUS FOR ESTIMATING CHANNELIZATION CODES IN A WIRELESS TRANSMIT/RECEIVE UNIT

(75) Inventors: Jaeyoung Kwak, Morganville, NJ (US); Donald M. Grieco, Manhasset, NY (US); Kyle Jung-Lin Pan, Smithtown, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 47 days.

(21) Appl. No.: 12/424,914

(22) Filed: Apr. 16, 2009

(65) Prior Publication Data

US 2009/0201905 A1    Aug. 13, 2009

Related U.S. Application Data

(63) Continuation of application No. 11/095,400, filed on Mar. 31, 2005, now Pat. No. 7,684,378.

(60) Provisional application No. 60/625,906, filed on Nov. 8, 2004.

(51) Int. Cl.
*H04W 4/00* (2009.01)

(52) U.S. Cl. .................. 370/329; 370/341; 370/331; 370/310; 370/350

(58) Field of Classification Search .............. 370/331, 370/329, 320, 326, 321, 335, 310, 336, 337, 370/342, 347
See application file for complete search history.

(56) References Cited

U.S. PATENT DOCUMENTS

| | | | |
|---|---|---|---|
| 6,618,428 | B2 * | 9/2003 | Jechoux et al. ............. 375/141 |
| 6,778,588 | B2 * | 8/2004 | Li et al. .................. 375/130 |
| 6,795,417 | B2 | 9/2004 | Zeira et al. |
| 7,199,818 | B1 | 4/2007 | Engholm |
| 7,415,060 | B1 | 8/2008 | Holma |
| 2002/0196766 | A1 | 12/2002 | Hwang et al. |

(Continued)

FOREIGN PATENT DOCUMENTS

EP    1469610    10/2004

OTHER PUBLICATIONS

Castoldi et al., "Co-Channel Interference Mitigation Detectors for Multirate Transmission in TD-CDMA Systems," IEEE Journal on Selected Areas in Communications, vol. 20, No. 2, pp. 273-286 (Feb. 2002).

*Primary Examiner*—Huy Phan
(74) *Attorney, Agent, or Firm*—Volpe and Koenig, PC

(57) ABSTRACT

A method and apparatus for estimating channelization codes in a wireless transmit/receive unit (WTRU) using blind code detection (BCD). A WTRU receives communication bursts and detects a midamble in the received burst. A candidate code list is generated in accordance with the detected midamble. The candidate code list includes channelization codes intended for both the intended WTRU and other WTRUs. Active channelization codes among the codes in the candidate list are identified, and the identified codes are forwarded to a multi-user detector (MUD). Since the orthogonal variable spreading factor code maintains the orthogonality between codes of different SF, SFs of other WTRUs follow the SF of the intended WTRU. Moreover, since the data for other WTRUs is not used in symbol processing after MUD, the performance of MUD for the intended WTRU is preserved with the SF ambiguity of other WTRUs.

15 Claims, 2 Drawing Sheets

U.S. PATENT DOCUMENTS

| | | |
|---|---|---|
| 2003/0128742 A1 | 7/2003 | Johnson |
| 2003/0210754 A1 | 11/2003 | Burchert et al. |
| 2003/0223398 A1 | 12/2003 | Haim et al. |
| 2004/0002334 A1 | 1/2004 | Lee et al. |
| 2004/0052236 A1 | 3/2004 | Hwang et al. |
| 2004/0142712 A1 | 7/2004 | Rudolf |
| 2005/0002376 A1 | 1/2005 | Rimi et al. |
| 2005/0053048 A1 | 3/2005 | Van Der Wal et al. |
| 2005/0111408 A1 | 5/2005 | Skillermark et al. |
| 2005/0249305 A1 | 11/2005 | Ponnampalam |

* cited by examiner

METHOD AND APPARATUS FOR ESTIMATING CHANNELIZATION CODES IN A WIRELESS TRANSMIT/RECEIVE UNIT

CROSS REFERENCE TO RELATED APPLICATION

This application is a continuation of U.S. application Ser. No. 11/095,400, filed Mar. 31, 2005 which claims the benefit of U.S. Provisional Application No. 60/625,906, filed Nov. 8, 2004, which are incorporated by reference as if fully set forth.

FIELD OF INVENTION

The present invention is related to code detection in a wireless communication system. More particularly, the present invention is a method and apparatus for estimating channelization codes in a wireless transmit/receive unit (WTRU) using blind code detection (BCD).

BACKGROUND

A time division synchronous code division multiple access (TD-SCDMA) for mobile (TSM) system is a narrowband time division duplex/code division multiple access (TDD/CDMA) system. With a TSM system, it is preferable to use a multi-user detector (MUD) as a receiver to overcome small spreading factors (SFs) and high interference in order to provide a high data rate.

Optimally, a MUD requires information associated with transmitted channelization codes, the midambles associated with the channelization codes, and SFs in each time slot. This type of information is usually available in the TSM uplink. In contrast, in the TSM downlink, each WTRU is only aware of several of its own possible channelization codes, associated midambles, and their SFs in each time slot. WTRU is not aware of the particular active transmitted channelization codes, their particular SFs, or their particular associated midambles in each time slot. Furthermore, the WTRU is not aware of any information regarding other WTRUs. As a result of the ambiguity, the performance of the MUD suffers severe degradation.

Accordingly, it would be desirable to have a method and apparatus by which a WTRU estimates its transmitted channelization codes and the transmitted channelization codes of both the intended WTRU and other WTRUs.

SUMMARY

The present invention is a method and apparatus for estimating channelization codes in a WTRU. A WTRU receives communication bursts and detects a midamble in each received communication burst. A candidate code list is generated in accordance with the detected midamble. The candidate code list includes channelization codes intended for both the intended WTRU and other WTRUs. The codes that are to be considered as candidate codes for detection is a function of the midamble allocation scheme. Active channelization codes among the codes in the candidate list are identified and forwarded to a MUD.

The present invention resolves the ambiguity in the downlink of TSM. Orthogonal Variable Spreading Factor (OVSF) codes are used to keep the orthogonality between codes. Thus, even when different SFs are used between codes, due to the property of OVSF codes, the MUD is able to preserve the interference power, and the performance of the MUD for the particular WTRU's own channelization codes is preserved with the SF ambiguity of the channelization codes of other WTRUs. Moreover, since the data for the channelization codes of other WTRUs is not used in symbol processing after the MUD, the MUD only needs the active codes for other WTRUs to estimate the intra-cell interference from other WTRUs, not the data of other WTRUs.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment.

Figure 1:
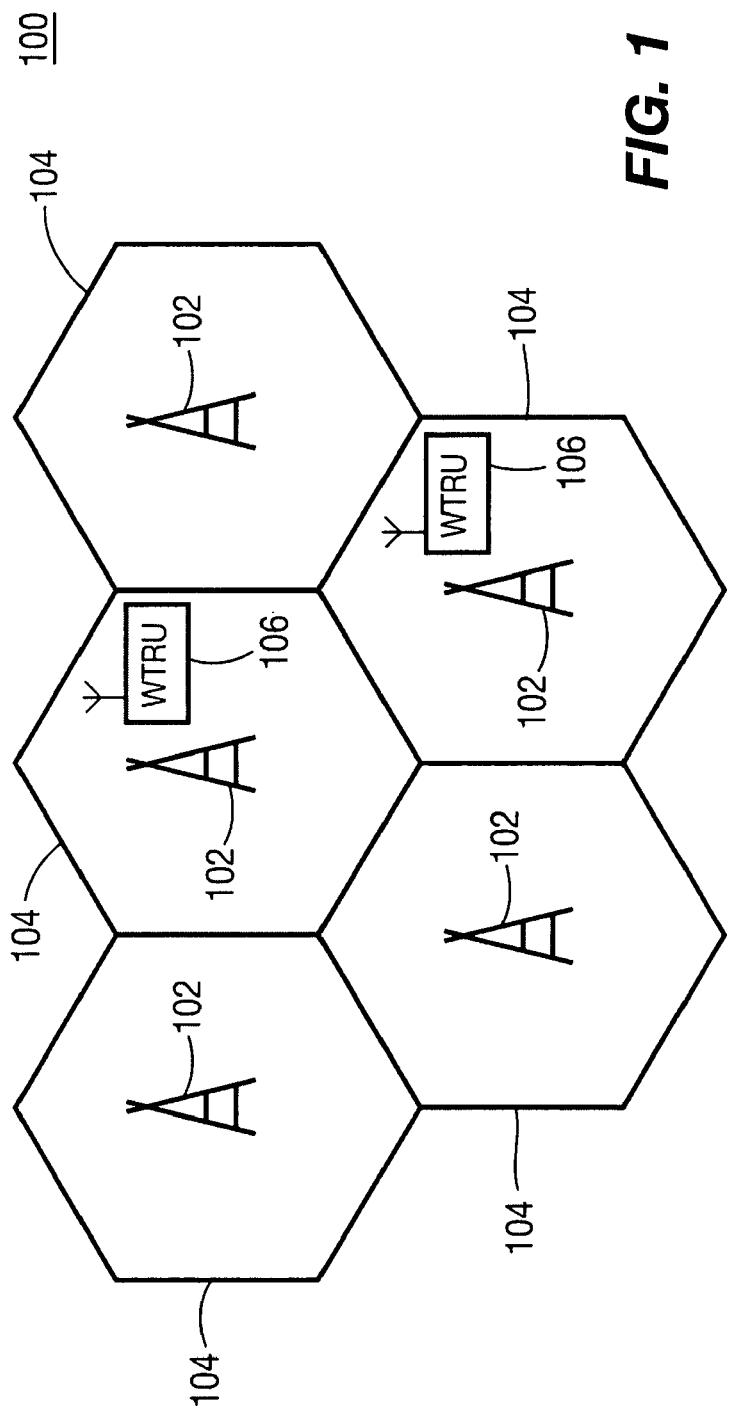
FIG. 1 is a diagram of a TDD/CDMA communication system.

FIG. 1 is a diagram of a TDD/CDMA communication system. The system 100 includes a plurality of base stations 102. Each base station 102 serves at least one cell 104 associated with each base station 102. WTRUs 106 communicate with a base station 102 in a cell 104 within which each WTRU 106 is located.

Figure 2:
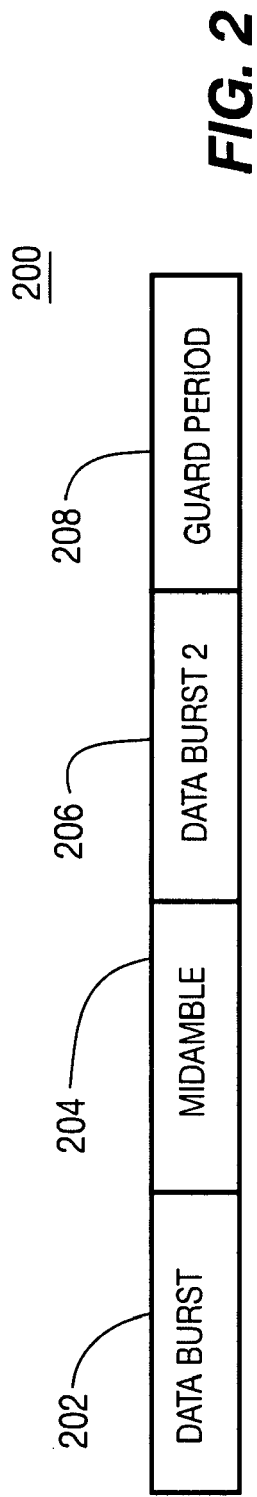
FIG. 2 is a diagram of a communication burst.

Data is transmitted using one or more communication bursts. Each communication burst carries data in a single time slot using a single channelization code, (i.e., a single resource unit). A typical communication burst 200 has a midamble 204, a guard period 208 and two data bursts 202, 206, as shown in FIG. 2. The midamble 204 separates the two data bursts 202, 206. The guard period 208 separates different communication bursts to allow for the difference in arrival times of bursts transmitted from different transmitters. The midamble 204 contains a midamble code for use in estimating the channel response between the receiver and the transmitter.

A receiver utilizes a MUD in accordance with the present invention. Since the operation of a MUD is well known to those of skill in the art, such details will not be described in detail herein. In general, a MUD processes baseband signals and recovers all communication data. To recover the data, the MUD needs to know all of the channelization codes used to transmit the bursts; not only transmitted channelization codes for the intended WTRU, but also all other transmitted channelization codes for other WTRUs.

The blind code detection (BCD) algorithm in accordance with the present invention estimates not only the active transmitted channelization codes for the intended WTRU, but also the channelization codes of other WTRUs based on the intended WTRU's own possible channelization codes and the detected midambles. For detection of a WTRU's own codes, the possibly allocated codes of each transport channel (TrCH) are kept in, or rejected from, the candidate code list depending on full discontinuous transmission (DTX) status. Once the codes of the intended WTRU have been detected, the codes of other WTRUs are detected with a threshold based on the energies of, and other rules based on the conditions of, the detected codes of the intended WTRU.

The present invention resolves the SF ambiguity in the downlink of TSM. The intended WTRU can get its own SF from higher layer information, as described in the third generation partnership project (3GPP) standards. However, the SFs of codes of other WTRUs are not known. Due to their properties, the OVSF codes used in TSM keep the orthogonality between codes, even when different SFs are used between codes. It permits the desired codes of the intended WTRU to maintain a high signal-to-interference-and-noise ratio (SINR), regardless of the SF ambiguity. As a consequence, the MUD is able to preserve the SINR for each desired code of the intended WTRU, which improves the performance of the MUD operating on the codes of the intended WTRU. Moreover, since the data for other WTRUs is not used in symbol processing after the MUD, the MUD only needs the active codes for other WTRUs to estimate the intra-cell interference from other WTRUs. The performance of the MUD will not be affected by this ambiguity. Therefore, in accordance with the present invention, the SFs of codes of other WTRUs are same as the SF of the codes of the intended WTRU, and it can be assumed that only one SF is transmitted in the same time slot.

Figure 3:
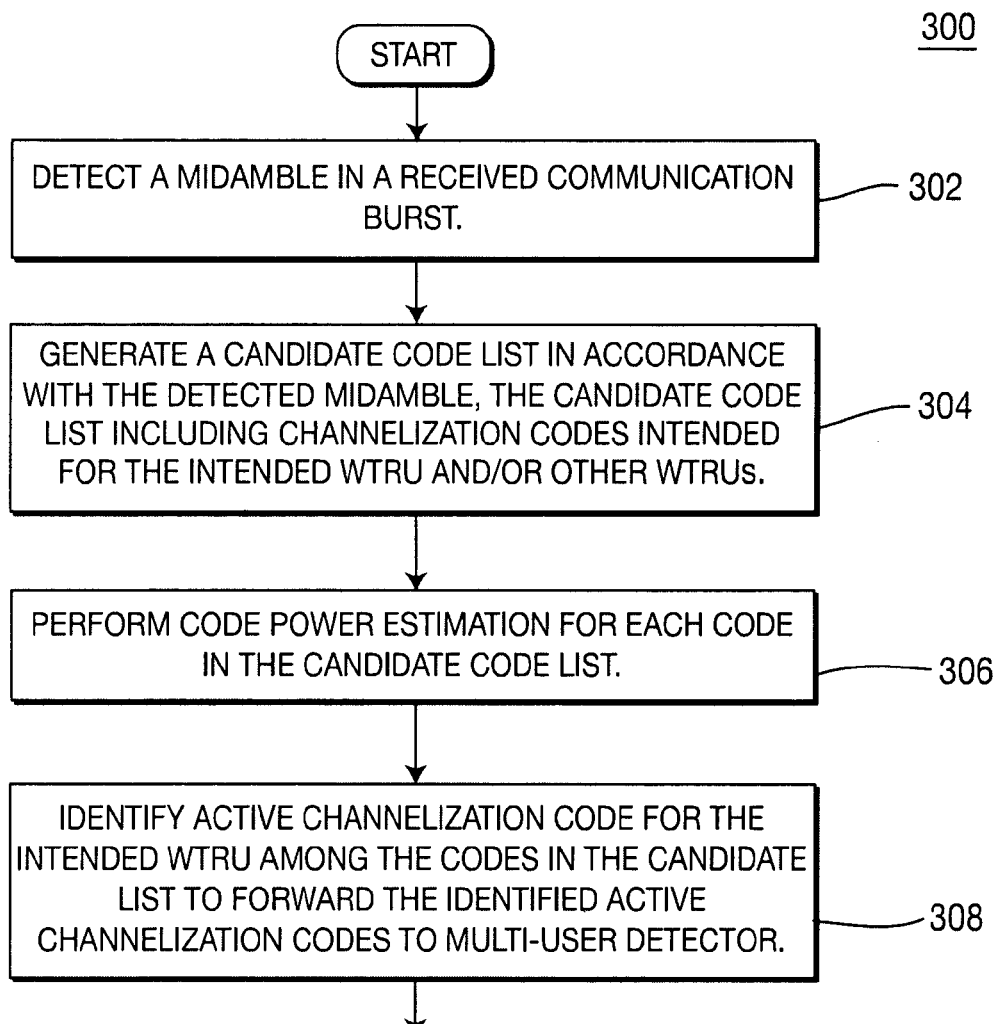
FIG. 3 is a flow diagram of a process for estimating active transmitted channelization codes in accordance with the present invention.

FIG. 3 is a flow diagram of a process 300 for estimating active transmitted channelization codes in accordance with the present invention. A receiver receives communication bursts and detects a midamble in a received communication burst (step 302).

The receiver generates a candidate code list in accordance with the detected midambles (step 304). The candidate code list is the list of channelization codes and associated parameters which may have been received in a timeslot. The candidate code list for the intended WTRU is determined based upon the midamble allocation scheme of the timeslot, the detected midamble shifts, and information about the known number of transmitted codes derived from higher layer information. The candidate code list for other WTRUs is generated based on the midamble allocation scheme of the timeslot and the detected midamble shifts.

Three schemes are currently utilized for midamble allocation: 1) default midamble allocation; 2) common midamble allocation; and 3) WTRU-specific midamble allocation. The codes that are considered as candidate codes for detection is a function of the midamble allocation scheme. In the default midamble allocation scheme, codes associated with detected midambles are included as candidate codes; including codes for the intended WTRU and other WTRUs. In the common midamble allocation scheme, all the codes having the detected SF are included as candidate codes; including codes for the intended WTRU and other WTRUs. In the WTRU-specific midamble allocation scheme, only the codes for the intended WTRU are included in the candidate code list.

In the first scheme, the default midamble allocation scheme, each midamble indicates a set of channelization codes which may have been transmitted. Once a midamble is detected, a channelization code or a set of channelization codes are included in the candidate code list. A common channel code is treated the same as a dedicated channel code for the intended WTRU, except that a common channel code transmitted as a beacon is identified as active if its respective midamble is detected, regardless of its code energy, which will be explained in detail hereinafter. In primary common control physical channel (P-CCPCH) time slots, the first and second P-CCPCH code sets are included in the candidate code list if their respective midambles are detected, and flagged not to be rejected by the code detect function.

During call set-up, a WTRU obtains information regarding an allocation of channelization codes and timeslots. Therefore, the WTRU has a list, (i.e., possible allocation list), which includes codes allocated to the WTRU. Accordingly, after all codes have been entered into the candidate code list, the WTRU searches the possible allocation list for each candidate code.

The candidate codes found in the WTRU's possible allocation list are maintained in the candidate code list while adding their TrCH number in the candidate code list. The candidate codes which are not found in the possible allocation list are removed from the candidate code list. This may be performed by identifying the TrCH as zero, which indicates that the code is allocated to other WTRUs.

In the second scheme, the common midamble allocation scheme, only one midamble shift is transmitted. The common midamble allocation scheme is applied only on a non-P-CCPCH timeslot. The midamble shift indicates the number of channelization codes transmitted in the timeslot. If the common midamble shift is not detected, no codes are inserted into the candidate code list. If the common midamble shift is detected, an appropriate number of codes are entered into the candidate code list according to the detected SF in the current time slot.

There are multiple choices of SF in the timeslot in the downlink. Therefore, the SF of one code in a current timeslot in the intended WTRU allocation list is checked and used to fill the candidate code list with the appropriate number of codes according to the detected SF. Each code is associated with the detected common midamble shift. For example, in non-beacon timeslots, there can be either one SF=1 code for the high data rate transmission or eight (8) SF=8 codes and sixteen (16) SF=16 codes for the normal transmission in the timeslot. The SF of one code in the current timeslot in the WTRU's possible code allocation list is checked and used to fill the candidate code list with one SF=1 code or eight (8) SF=8 codes and sixteen (16) SF=16 codes, each associated with the detected common midamble shift.

After all codes have been entered into the candidate code list, the WTRU's possible allocation list is searched for each candidate code. The candidate codes found in the WTRU's possible allocation list are maintained in the candidate code list while adding their TrCH number in the candidate code list. Whereas, the candidate codes which are not found in the WTRU's possible allocation list are removed from the candidate list such as by identifying the TrCH as zero, which indicates that the code is allocated to other WTRUs.

In the third scheme, the WTRU-specific midamble allocation scheme, the WTRU has no knowledge of midamble-to-code associations for codes possibly allocated to other WTRUs. Therefore, it is impractical to detect other WTRU channelization codes. Thus, in WTRU-specific midamble allocation scheme, for every detected midamble shift, the WTRU simply searches its possible allocation list and adds to the candidate code list those codes associated with the detected midamble. Channelization codes for other WTRUs are not added to the candidate code list.

The transmission of the P-CCPCH with space code transmit diversity (SCTD) requires special handling in generating the candidate code list. If only one of two P-CCPCH midambles is detected, it may be that either only one was transmitted, or both were transmitted but only one is detected. In this case, the detected midamble is entered into the candidate code list as codes 0 and 1 or codes 2 and 3, depending on which midamble code is detected among k=1 and k=2, where k denotes midamble shifts. If both P-CCPCH midambles are detected, four P-CCPCH codes are in essence collapsed into one another in the MUD, and thereafter treated as two codes. In this case, only two codes, code 0 and 1 and k=1, should be entered into the candidate code list, as common channel codes.

The receiver then performs code power estimation for each code in the candidate code list (step 306). The code power estimation is implemented based on matched filtering the received signal for data symbols. The power of the k-th channelization code is estimated by Equation (1):

$$E_k = \frac{1}{N_s \cdot P_k} \cdot \sum_{n=1}^{N_s} \left( |s_o^{(k)}(n) + s_e^{(k)}(n)|^2 \right). \quad \text{Equation (1)}$$

The odd and even symbols $s_o^{(k)}(n)$ and $s_e^{(k)}(n)$ are the symbols estimated from the odd and even samples corresponding to the odd and even channel estimates $\underline{h}_o^{(k)}$ and $\underline{h}_e^{(k)}$, respectively. To make a fast BCD, the symbols may be estimated by the white matched filter (WMF) as shown in Equation (2):

$$\underline{s}_i = A_i^H \underline{r}_i, \quad \text{Equation (2)}$$

where $\underline{s}_i$ denotes the estimated even or odd symbols and $\underline{r}_i$ denotes the received even or odd symbols. Each column of the system matrix $A_i$ is composed by the convolution of channel response and spreading code as shown in Equation (3):

$$\vec{b}_i^{(k)} = \vec{c}^{(k)} \otimes \vec{h}_i^{(k)}, \quad \text{Equation (3)}$$

where $\vec{c}^{(k)}$ and $\vec{h}_i^{(k)}$ are the spreading code and its associated channel responses. $P_k$ is the square sum of the elements of $\vec{b}_i^{(k)}$. In an over-sampling case, even and odd powers are summed.

For the case where SCTD has been detected, diversity combining of the one data sequence transmitted on two antennas using the first two midambles, $m^{(1)}$ and $m^{(2)}$ for $K_{cell}=8$, respectively, ($K_{cell}$ denotes maximum number of midamble shift), is achieved using the following Equations (4) and (5):

$$\vec{b}^{(1)} = \vec{b}^{(1)} + \vec{b}^{(3)}; \text{and} \quad \text{Equation (4)}$$

$$\vec{b}^{(2)} = \vec{b}^{(2)} + \vec{b}^{(4)}, \quad \text{Equation (5)}$$

and subsequently ignoring or eliminating $\vec{b}^{(3)}$ and $\vec{b}^{(4)}$.

The receiver then identifies active channelization codes among the codes in the candidate code list to be forwarded to the MUD (step 308). Identification of active channelization codes includes identification of the intended WTRU's active codes and identification of active codes of other WTRUs. Active codes of other WTRUs are identified only in default and common midamble allocation schemes.

The objectives of active code identification of the intended WTRU are to avoid incorrectly rejecting active codes of the intended WTRU, (which would result in a significant data loss), and to incorrectly declare an in-fact inactive code as active, (which has much less impact on a block error rate (BLER)). Therefore, unless the current timeslot is sitting on a full DTX status, all of the candidate codes of a WTRU are accepted and forwarded to the MUD as active codes. This simplifies the detection procedure.

The objective of active code identification of other WTRUs is to identify strong codes of other WTRUs and to avoid having the MUD demodulate false or weak codes of other WTRUs. Strong codes of other WTRUs are significant sources of intra-cell interference. Weak codes of other WTRUs do not significantly interfere or degrade performance. Therefore, active channelization codes for other WTRUs are identified in accordance with the code power estimation obtained in step 306.

After active codes of the intended WTRU are identified, other WTRU active codes are identified using a threshold based on the energies of the intended WTRU codes and attributes of the intended WTRU's TrCHs. Simply, all codes, (in the common midamble allocation scheme), or some codes not allocated to the intended WTRU, (in the default midamble allocation scheme), may be identified as active codes of other WTRUs. Preferably, only the codes exceeding the threshold are identified as active channelization codes. The threshold is decided by the maximum energy among the energies of all codes of the intended WTRU in the candidate code list for the intended WTRU.

Alternatively, the average energy of the intended WTRU's codes may be utilized as the threshold. By using the maximum energy of the intended WTRU's code, the tradeoff reduces the number of possibly false codes of other WTRUs while having the negative effect of eliminating the codes of other WTRUs.

Weak codes may be rejected if there is more than the maximum number of codes for a time slot in the candidate code list. The number of codes is reduced to the maximum number of codes for a time slot by eliminating one by one of the weakest codes of other WTRUs until the number of codes is at or below the maximum.

After the active code detection, all the related information, (i.e., the associated midamble shift, SF and total number of codes), for detected codes is forwarded to the MUD. The MUD uses this information for demodulation.

Figure 4:
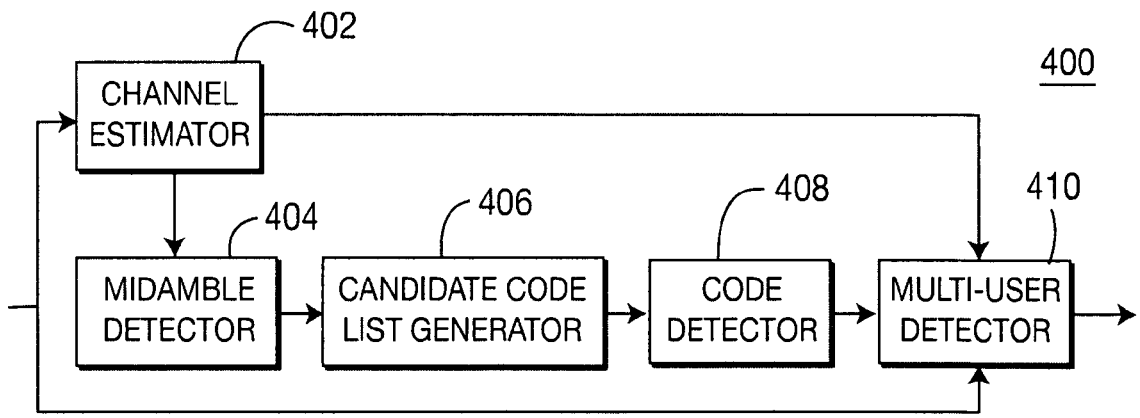
FIG. 4 is a block diagram of an apparatus for estimating active transmitted channelization codes in accordance with the present invention.

FIG. 4 is a block diagram of an apparatus 400 for estimating active transmitted channelization codes in accordance with the present invention. The apparatus 400 comprises a channel estimator 402, a midamble detector 404, a candidate code list generator 406, a code detector 408 and a MUD 410. Although the component devices are illustrated as separate devices, one or more devices may be incorporated as a part of the MUD or other device.

At a receiver, transmitted signals are received by an antenna (not shown) and the received signals are converted to baseband signals. The channel estimator 402 estimates a channel response, and the estimated channel response is entered into the midamble detector 404 and the MUD 410.

After channel estimation, the midamble detector 404 detects the transmitted midamble. Based on the detected midamble, the candidate code list generator 406 generates a candidate code list based on the detected midamble in accordance with the midamble allocation scheme. The code detector 408 identifies active codes for the intended WTRU and other WTRUs. The active codes of the intended WTRU are identified in accordance with DTX status. The active codes of other WTRUs are preferably identified by measuring code power of each code in the candidate code list with reference to a predetermined code power threshold. The code detector 408 measures the energy of each code in the candidate code list, whereby the code detector 408 identifies active codes of other WTRUs above the predetermined threshold. The code detector 408 provides a set of channelization codes, SFs and channel response offsets to the MUD 410 for use in the current timeslot.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) comprising:
    a receiver configured to receive a communication burst transmitted using an actual channelization code for the WTRU and at least one other actual channelization code for other WTRUs, the WTRU not knowing the actual channelization code and the at least one other actual channelization code;
    a midamble detector configured to: (1) detect a midamble in the received communication burst, the midamble having one of a plurality of midamble schemes, and (2) determine the one of the plurality of midamble schemes;
    a candidate code list generator configured to generate, as a function of the determined one of the plurality of midamble schemes, a list of channelization codes that could be at least one of the actual channelization code and the at least one other actual channelization code; and
    a code detector configured to (1) identify active channelization codes for the WTRU and for the other WTRUs included in the list of channelization codes and (2) forward the identified active channelization codes to a multi-user detector (MUD), the MUD being configured to use the identified active channelization codes to recover data from the communication burst.

2. The WTRU of claim 1, wherein the one of the plurality of midamble schemes is a default midamble scheme.

3. The WTRU of claim 2, wherein for the default midamble scheme, the detected midamble includes a set of potential channelization codes which were potentially transmitted with the communication burst.

4. The WTRU of claim 3, the candidate code list generator is further configured to include in the list of channelization codes all of the potential channelization codes included in the set.

5. The WTRU of claim 4, wherein the code detector is further configured to:
    obtain a list of channelization codes allocated to the WTRU, and
    identify as the active codes for the WTRU the channelization codes that are included in the list of channelization codes allocated to the WTRU.

6. The WTRU of claim 1, wherein the one of the plurality of midamble schemes is a common midamble allocation scheme.

7. The WTRU of claim 6, wherein:
    in the common midamble allocation scheme, the communication burst carries data only in a non-P-CCPCH time slot and only one midamble shift is transmitted with the communication burst, the midamble shift indicating a number of channelization codes that were transmitted; and
    the candidate code list generator is further configured to:
        on a condition that the midamble shift is not received, include no channelization codes in the list of channelization codes, and
        on a condition that the midamble shift is received, including, in the list of channelization codes, a number of channelization codes equal to the number of channelization codes indicated by the received midamble shift, the included codes being selected according to at least one SF used in the received communication burst.

8. The WTRU of claim 7, wherein the code detector is further configured to:
    obtain a list of channelization codes allocated to the WTRU, and
    identify as the active codes for the WTRU the channelization codes that are included in the list of channelization codes allocated to the WTRU.

9. The WTRU of claim 1, wherein the one of the plurality of midamble schemes is a WTRU-specific midamble scheme.

10. The WTRU of claim 9, wherein:
    the detected midamble includes at least one midamble shift; and
    the candidate code list generator is further configured to include in the list of channelization codes channelization codes for the WTRU and not include channelization codes for other WTRUs.

11. The WTRU of claim 10, wherein:
    the actual channelization code and the at least one other actual channelization code are orthogonal variable spreading factor codes (OVSF); and
    the code detector is further configured to:
    obtain an SF associated with the WTRU from a higher layer,
        assume that only one SF was used in the received communication burst and that an SF associated with the other WTRUs is the SF associated with the WTRU, and
        forward the SF associated with the WTRU and the SF associated with the other WTRUs to the MUD.

12. The WTRU of claim 1, wherein the code detector is further configured to:
    identify all of the channelization codes included in the generated list as active channelization codes for the WTRU unless the received communication burst is sitting on a full discontinuous transmission (DTX) status.

13. The WTRU of claim 12, wherein the code detector is further configured to:
    estimate a code power estimation for each of the channelization codes included in the generated list; and
    identify each of the channelization codes as active channelization codes for the other WTRUs if the code power estimation for the channelization code exceeds a threshold.

14. The WTRU of claim 13, wherein the threshold is selected from a group consisting of the code power estimation that has the highest value of all the estimated code power estimations and an average energy of the channelization codes identified as active channelization codes for the WTRU.

15. A method for estimating channelization codes for an intended wireless transmit/receive unit (WTRU) and other WTRUs in a time division synchronous code division multiple access (TD-SCDMA) for mobile (TSM) downlink transmission without knowing spreading factors (SFs) for other WTRUs, the method comprising:
    a receiver configured to receive a communication burst transmitted using an actual channelization code for the WTRU and at least one other actual channelization code for other WTRUs, the WTRU not knowing the actual channelization code and the at least one other actual channelization code;
    a midamble detector configured to: (1) detect a midamble in the received communication burst, the midamble having one of a plurality of midamble schemes, and (2) determine the one of the plurality of midamble schemes;
    a candidate code list generator configured to generate, as a function of the determined one of the plurality of midamble schemes, a list of channelization codes that could be at least one of the actual channelization code and the at least one other actual channelization code; and a code detector configured to (1) identify active channelization codes for the WTRU and for the other WTRUs included in the list of channelization codes and (2) forward the identified active channelization codes to a multi-user detector (MUD), the MUD being configured to use the identified active channelization codes to recover data from the communication burst.

* * * * *